(12) United States Patent
Lee et al.

(10) Patent No.: US 9,981,746 B2
(45) Date of Patent: May 29, 2018

(54) DISPENSING ARCHITECTURE FOR A HYBRID FOUNTAIN BEVERAGE CONSUMABLE CART AND GALLEY DISPENSING SYSTEM

(71) Applicant: MAG Aerospace Industries, LLC, Glendale, CA (US)

(72) Inventors: Thomas M. Lee, Coto de Caza, CA (US); Fred M. Reed, Brea, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 229 days.

(21) Appl. No.: 14/658,957

(22) Filed: Mar. 16, 2015

(65) Prior Publication Data

US 2015/0266580 A1 Sep. 24, 2015

Related U.S. Application Data

(60) Provisional application No. 61/954,644, filed on Mar. 18, 2014.

(51) Int. Cl.
*B67D 7/74* (2010.01)
*B64D 11/00* (2006.01)
(Continued)

(52) U.S. Cl.
CPC .......... *B64D 11/0007* (2013.01); *A47B 31/06* (2013.01); *B67D 1/0042* (2013.01); *A47B 2031/002* (2013.01)

(58) Field of Classification Search
CPC ............ B67D 2210/00139; B67D 7/84; B67D 7/845; B67D 1/0042; A47B 31/06;
(Continued)

(56) References Cited

U.S. PATENT DOCUMENTS 3,275,393 A * 9/1966 Conklin ................. A47B 31/02
219/214
3,517,899 A * 6/1970 Vernon ................. A47B 77/02
105/327
(Continued)

FOREIGN PATENT DOCUMENTS

DE 102006021204 A1 11/2007
EP 2868243 A1 5/2015

OTHER PUBLICATIONS

International Patent Application No. PCT/US2015/020737, International Search Report and Written Opinion dated Jun. 11, 2015, 12 pages.

(Continued)

*Primary Examiner* — Patrick M Buechner
(74) *Attorney, Agent, or Firm* — Kilpatrick Townsend & Stockton LLP; Dean W. Russell; Kristin M. Crall

(57) ABSTRACT

Embodiments of the invention described herein thus provide systems and methods for providing fountain beverage consumables in an easily accessible and removable and replaceable form. In one example, the fountain beverage consumables are provided on a cart that has interface connections with a dispensing unit. The dispensing unit may be mounted in a galley. When the cart is in its docking station with respect to the dispensing unit, fluid communication between the fountain beverage consumables and the dispensing unit is provided.

19 Claims, 10 Drawing Sheets

(51) Int. Cl.
*B67D 1/00* (2006.01)
*A47B 31/06* (2006.01)
*A47B 31/00* (2006.01)

(58) Field of Classification Search
CPC ........ A47B 2031/002; A47B 2031/003; A47B 31/02; A47B 2031/023; B64D 11/0007
See application file for complete search history.

(56) References Cited

U.S. PATENT DOCUMENTS

| | | | | |
|---|---|---|---|---|
| 3,677,173 | A * | 7/1972 | Fogle, Jr. | A47J 39/02 126/37 R |
| 3,752,549 | A * | 8/1973 | Binks | A47J 39/006 312/236 |
| 4,076,349 | A * | 2/1978 | Gettleman | A47B 31/02 312/236 |
| 4,087,142 | A * | 5/1978 | Aumack | A47J 39/006 165/61 |
| 4,285,391 | A * | 8/1981 | Bourner | A47J 39/006 165/61 |
| 5,285,051 | A * | 2/1994 | DeGrow | A23L 3/365 165/919 |
| 5,390,834 | A * | 2/1995 | Bitter | A47B 31/02 222/113 |
| 5,626,353 | A * | 5/1997 | Campbell | A47B 31/02 280/47.35 |
| 5,702,115 | A * | 12/1997 | Pool | A61G 12/001 280/47.35 |
| 6,135,009 | A * | 10/2000 | Lassota | A47J 31/007 141/231 |
| 2003/0173376 | A1 | 9/2003 | Bilskie et al. | |
| 2004/0112917 | A1* | 6/2004 | Groesbeck | B67D 1/0021 222/105 |
| 2004/0140013 | A1* | 7/2004 | Yacko | B67D 1/124 141/94 |
| 2008/0120187 | A1 | 5/2008 | Wesley et al. | |
| 2012/0318822 | A1 | 12/2012 | Strauss | |
| 2015/0057796 | A1* | 2/2015 | Boodaghians | B64D 11/0007 700/236 |
| 2015/0070492 | A1* | 3/2015 | Hozumi | B64D 11/0007 348/143 |
| 2015/0097001 | A1* | 4/2015 | Gatipon | B67D 1/0857 222/108 |
| 2016/0175176 | A1* | 6/2016 | Pamplona Rovira | A61G 12/001 280/79.2 |
| 2016/0257407 | A1* | 9/2016 | Vandewall | B64D 11/04 |
| 2016/0338488 | A1* | 11/2016 | Garcia | B64D 11/0007 |

OTHER PUBLICATIONS

David Szondy, "Skytender Trolley Brings Robotic Bartending to Airlines", Dec. 17, 2012, XP002739385, retrieved from the internet: URL:http://www.gizmag.comjskytender-airline-drink-dispenser/25456/.

* cited by examiner

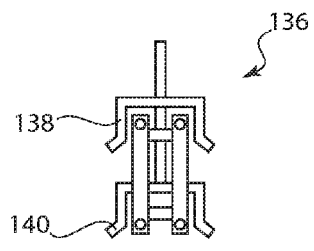 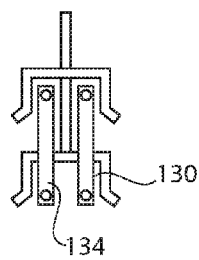 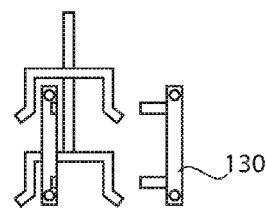
FIG. 14A  FIG. 14B  FIG. 14C
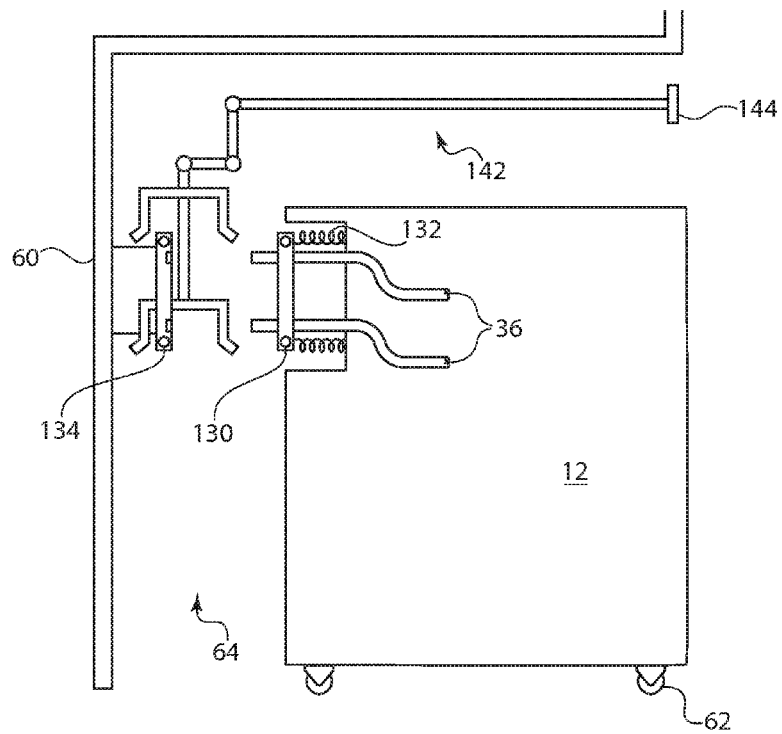
FIG. 14D

_

DISPENSING ARCHITECTURE FOR A HYBRID FOUNTAIN BEVERAGE CONSUMABLE CART AND GALLEY DISPENSING SYSTEM

CROSS REFERENCE TO RELATED APPLICATIONS

This application claims the benefit of U.S. Provisional Application Ser. No. 61/954,644, filed Mar. 18, 2014, titled "Soda dispensing architecture hybrid system," the entire contents of which are hereby incorporated by reference.

FIELD OF THE DISCLOSURE

Embodiments of the present disclosure relate generally to a soda dispensing architecture for use with a cart or trolley that cooperates with a galley or other stationary location. The cart or trolley may contain the consumable items used in a soda dispensing system, and the galley or other stationary location may contain a dispensing feature.

BACKGROUND

Typical aircraft beverage service includes attendant service of soda and juices out of aluminum cans and bottles. This creates a good deal of waste from the cans and bottles that must be stored in the aircraft galley or elsewhere. Offering canned and bottled beverages is also an expense for airlines. Research has shown there would be about a $0.07 savings per serving by switching from canned and bottled beverages to fountain beverages. However, there are challenges with offering fountain beverages on board an aircraft or other passenger transport vehicle.

For example, there is a great deal of complexity that goes into dispensing systems that are intended to be mobile, such as a dispensing system on an aircraft trolley cart. Additionally, there are regulatory issues to be considered when installing compressed air, such as $CO_2$, on board an aircraft. Further, some of the more popular soda companies have very stringent requirements that must be met in order for a location to become certified in order to make and offer its beverage products. The requirements may include certain water temperature, water quality, syrups, carbonation, and so forth. Historically, it has been proven difficult for an aircraft to meet such certifications in order to offer fountain beverages on flights.

One attempted solution has it been to install a soda dispensing system on an aircraft trolley. These attempts have included a trolley that holds the compressed $CO_2$, the soda syrups, the water, and a dispensing area. One example of such a bar cart has been designed by a company called air eltec, and is called "skytender." This cart is advertised as a full service bar/beverage trolley that does away with the costs of canned beverages. Because this system is designed to traverse the aircraft aisle, it must be individually powered. Additionally, there is a single point of failure for such a cart. If any component of the dispensing area of the cart fails (such as problems with deployment of the pop-up panel dispensing area or the touch screen control system), if the cart loses power, or if any other portion of the cart system fails, the airline would be unable to offer beverage service for the entire flight. Accordingly, some airlines have simply determined that it is an easier solution to offer beverage service with cans and bottles in order to eliminate the potential failure issue, the certification issue, and the regulatory issues.

However, it continues to be desirable for improvements that would allow an aircraft or other passenger transport vehicle to offer fountain beverages on board.

BRIEF SUMMARY

Embodiments of the invention described herein thus provide systems and methods for providing fountain beverage consumables in an easily accessible and removable and replaceable form. In one example, the fountain beverage consumables are provided on a cart that has interface connections with a dispensing unit. The dispensing unit may be mounted in a galley. When the cart is in its docking station with respect to the dispensing unit, fluid communication between the fountain beverage consumables and the dispensing unit is provided.

BRIEF DESCRIPTION OF THE DRAWINGS

FIGS. 14A-14D show side schematic views of a second locking mechanism.

DETAILED DESCRIPTION

Embodiments of the present disclosure generally provide a system for refilling and maintaining an on-aircraft soda dispensing system 10. Most airlines seek to provide an aircraft turn around time at the gate that is as short as possible. Accordingly, it is desirable that the refilling process for any fountain beverage consumables, such as carbon dioxide and soda syrup which will be consumed on every flight, be as streamlined as possible. It is generally not optimal for aircraft attendees to be refilling carbon dioxide and syrup in the short turnaround time allowed.

Figure 1:
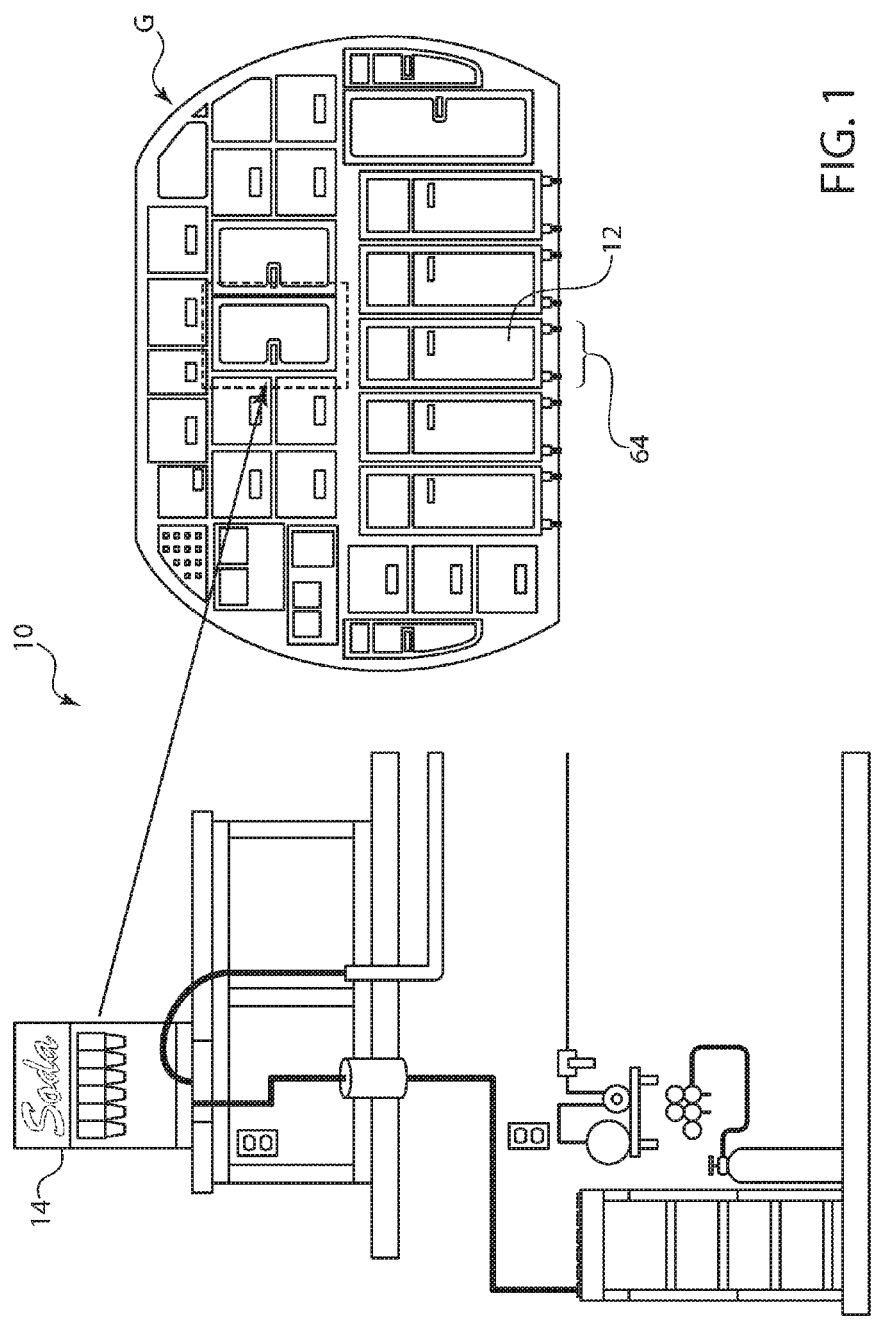
FIG. 1 shows a schematic view of one embodiment of a dispensing system for use on board a passenger transport vehicle.

In one example, there may be provided a fountain beverage consumables cart 12 that is designed to store and transport fountain beverage consumables. There may also be provided a stationary dispensing unit 14 in an aircraft galley or other location on-board the aircraft. The cart 12 is designed to cooperate (either directly or indirectly) with the stationary dispensing unit 14, such that the fountain beverage consumables being held in the cart may be appropriately delivered to the dispensing unit 14. For example, there may be a connection system 16 provided that enables such cooperation. This will provide a hybrid system 10, which uses a stationary dispensing unit 14 that is served by a mobile cart 12. An exemplary hybrid system 10 is shown in FIG. 1.

As illustrated, it is possible for a dispensing unit 14 to take the shape of one of the standard refrigerator/freezer or oven units positioned in the galley. In one specific example, a standard size for such units is an ARINC Size 2 device. As shown in FIG. 1, one of the ARINC Size 2 compartments may be a dispensing unit 14. Specific details of the dispensing unit 14 are described below.

Figure 2:
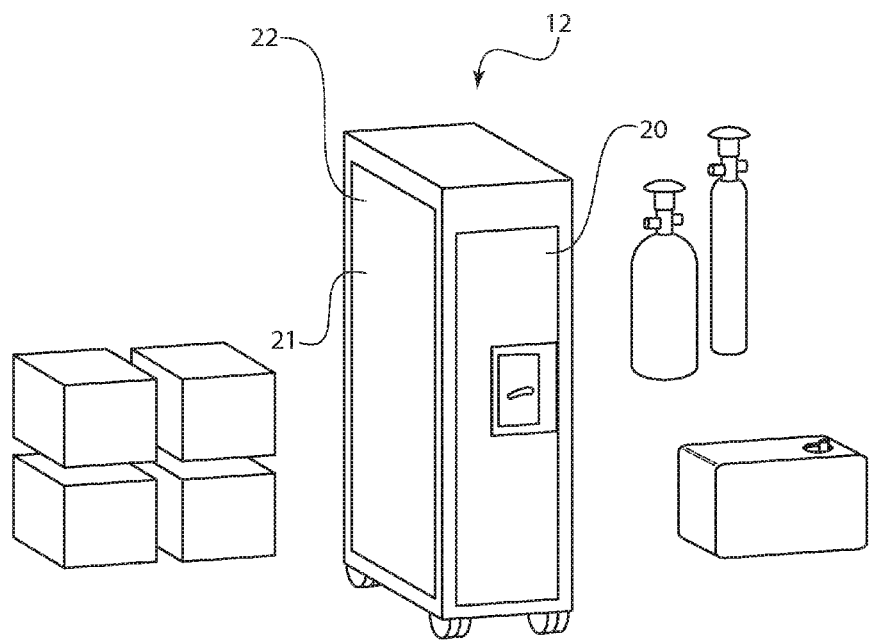
FIG. 2 shows a front perspective view of one embodiment of a fountain beverage consumable cart that may be used to carry syrups, carbon dioxide bottles, and/or water in tanks.
Figure 7:
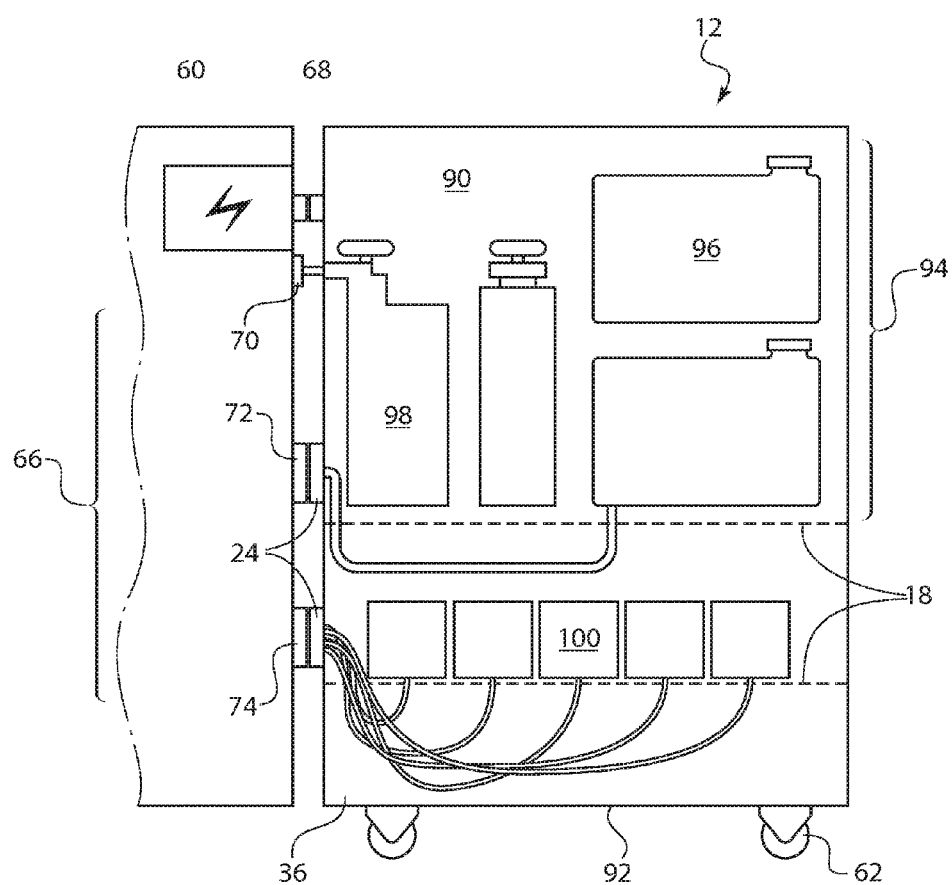
FIG. 7 shows a side cross-sectional view of a soda consumable cart docked with respect to a galley wall.

Next, there may be provided a cart 12 that is configured to contain disposable fountain beverage consumables. Such consumables include but are not limited to such a syrups, fresh water, and $CO_2$ bottles. It is believed to be preferable that the cart 12 can contain standard sizes of syrup boxes and carbon dioxide bottles, such that the industry standard does not need to be changed. An exemplary cart 12 is shown in FIG. 2. The cart 12 may have one or more shelves 18 contained in the interior of the cart 12, as shown in FIG. 7. The cart 12 may also have a front door 20 that closes in order to contain the fountain beverage consumables, as well as to provide a clean look to the cart 12. The door 20 may latch in any appropriate way that is approved by the Federal Aviation Administration (FAA), or using any other door closure mechanisms that are consistent with aircraft carts and trolleys. It is also possible to provide one or more of the sides 21 of the cart 12 as openable in order to ease access to any of the fountain beverage consumables as well.

Figure 3:
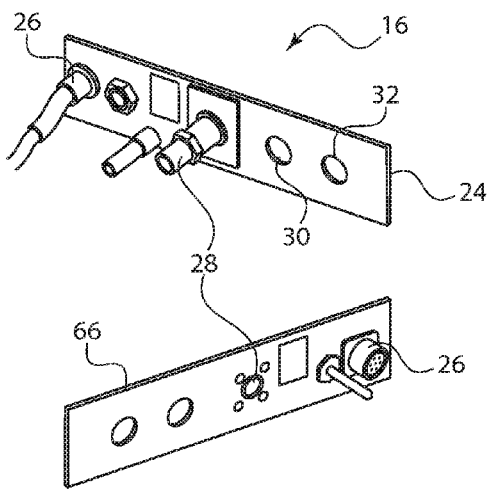
FIG. 3 shows a rear view of one embodiment of a connection feature that may be used on-board a cart of FIG. 2.

The cart 12 may also have a rear wall 22. Rear wall 22 may be provided with a connect feature 24. The connect feature 24 may be designed to be a rapid connect/disconnect design that will allow the cart 12 to "plug into" a corresponding connect port on an aircraft galley. Examples of a potential connect feature 24 is illustrated by FIG. 3. Although it is believed that providing the connect feature 24 on the rear wall 22 of the cart 12 will provide optimal ease of use, it should be understood that connect feature 24 may be provided elsewhere on the cart 12, as desired. For example, the connect feature may be provided on one or both of the cart sides 21.

The general purpose of connect feature 24 is to allow a connection between the cart 12 and the dispensing unit 14. As illustrated, the connect feature 24 may have an aircraft power connection 26: For example, a standard rapid connection for power in the aircraft may be provided. This may be similar to such power connections currently used for aircraft beverage makers. The connect feature 24 may also have a water connection 28. The connect feature 24 may further have one or more syrup connections 30. The connect feature 24 may also have a $CO_2$ connection 32.

Figure 4:
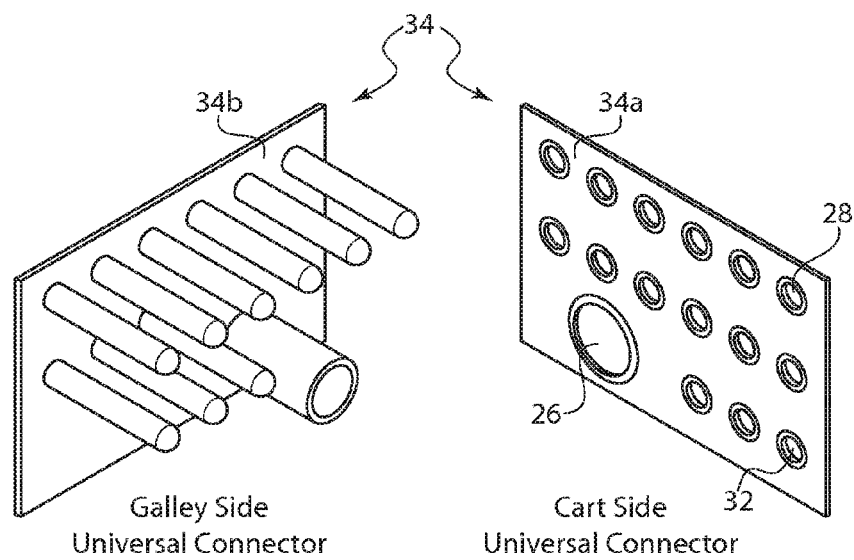
FIG. 4 shows a schematic of one example of a universal connector feature.

As shown in FIG. 4, it is possible to provide a universal connector system 34. This may be useful when there is a large number of syrups (for soda flavors) and/or a large number of juice options to be provided. For example, the cart side universal connector 34a may have about 15 to 20 fluid connections 30 in the connector 34a for syrups. The universal connector 34a may also have a pressurized gas line connector 32 for the carbon dioxide bottle to connect into the galley, a water line connector 28, and a power connector 26. As shown in FIG. 4, these connectors may be female connectors, with the galley side universal connector 34b comprising corresponding male connectors. It should be understood that alternatively, the connectors may be switched and that other connector types may be used.

Figure 5:
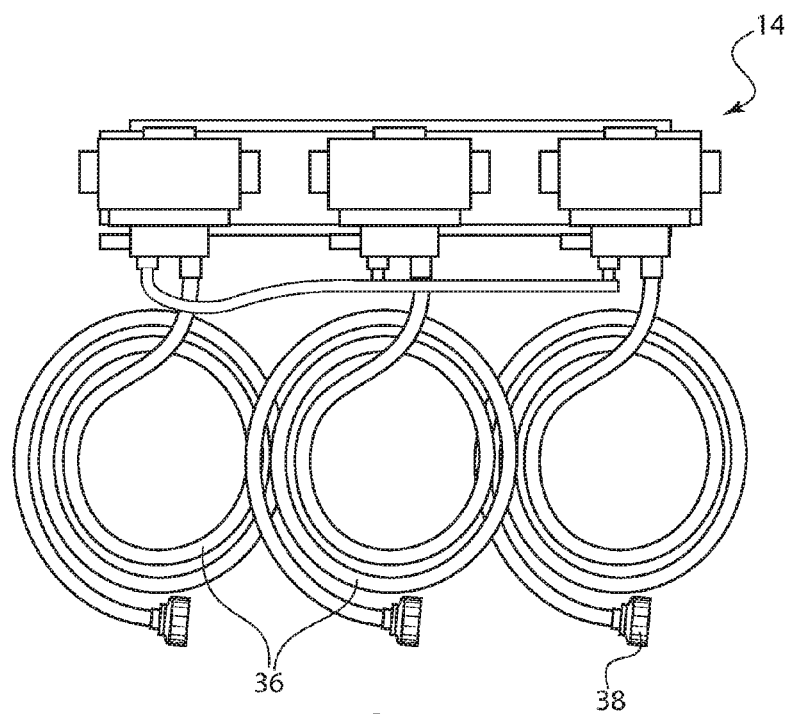
FIG. 5 shows one example of fluid hoses that may be used to connect fountain beverage consumables with a dispensing unit.

Certain of these connections may be in fluid communication with one or more hoses 36. For example, the syrup, water, and carbon dioxide connections may need to be in fluid communication with one or more corresponding connections on the dispensing unit 14. Accordingly, one or more hoses 36 may be provided for ease of connection. FIG. 5 illustrates exemplary hoses 36 that may extend from dispensing unit 14. The hoses 36 may have an end connector 38 that connects to the universal connector 34.

Figure 6:
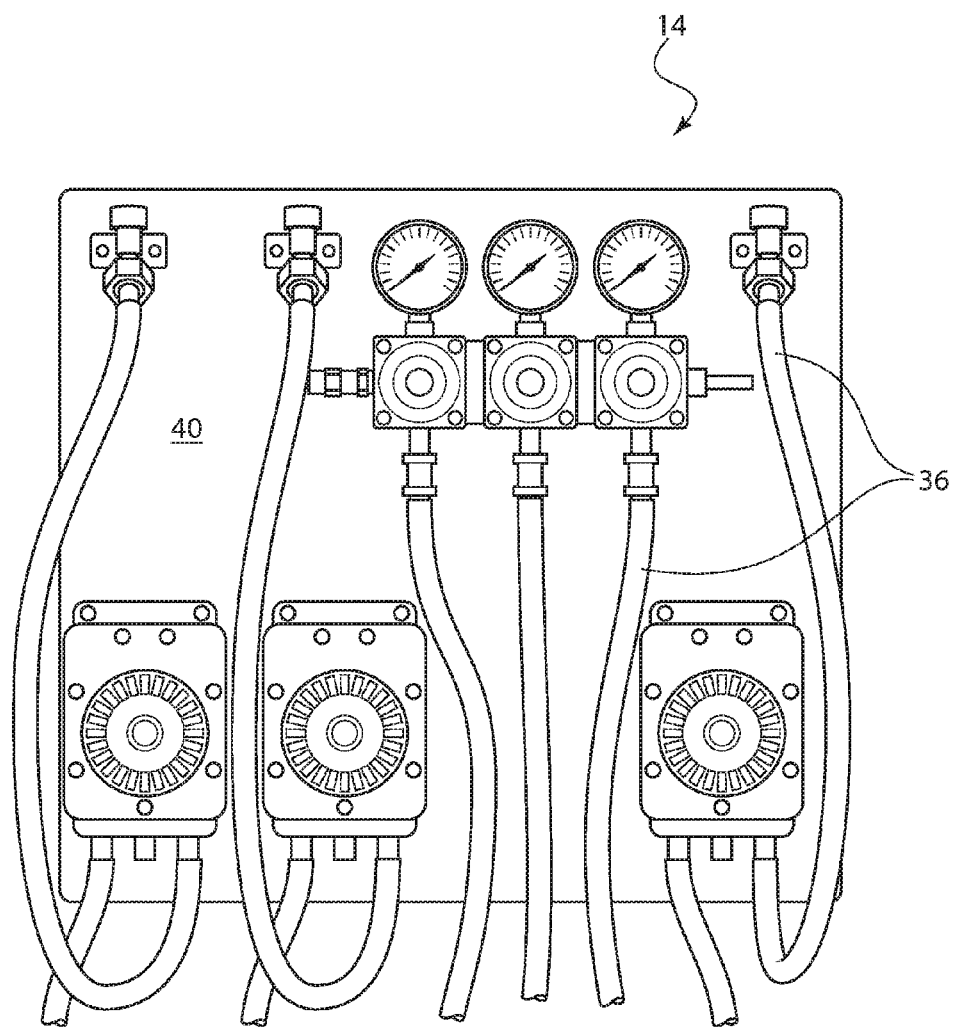
FIG. 6 shows a rear view of one embodiment of a dispensing unit with related hoses, gauges, and valves.

FIG. 6 shows a plurality of hoses 36 extending from a rear wall 40 of a dispensing unit 14. This figure also illustrates various gauges and valves that may be provided as necessary, in order to monitor the quality of the beverages being dispensed. For example, some beverage companies require certain temperatures and/or pressures of the initial soda components, such as the water and/or the carbon dioxide.

FIG. 7 illustrates one way in which a cart 12 may interface with a galley wall 60. In this example, the cart 12 is shown as having wheels 62 relative to the cart lower surface 92, which allow the cart to be removed and replaced into its position easily. Reference back to FIG. 1 illustrates an exemplary position 64 for the cart 12 in the galley area G. The position 64 may be a rear galley wall 60. The rear wall 60 may have one or more connection ports 66 that are designed to cooperate with one or more connect features 24 on the cart 12. As shown, it is possible to have more than one connect feature 24 and more than one connection port 66. For example, it is possible to have an aircraft power port 68, a carbon dioxide port 70, a filtered water port 72 and a syrup hose port 74. Although these options are shown as individual ports on FIG. 7, it should be understood that they may be compiled into a single universal port, which would have similar connections for cooperating with the universal connector feature shown in FIG. 4.

FIG. 7 shows a side view of a fountain beverage consumable delivery cart 12 in its docking position. In various embodiments, the cart 12 has a main container body 90 with one or more shelves 18. The shelves 18 may be secured in particular positions, or they may be removable and replaceable so that the cart container body 90 may be modified, depending upon the size and amount of the fountain beverage consumables to be contained. As a shown, housed at least partially within container body 90 are fountain beverage consumables 94. These consumables may include one or more of clean water tanks 96, carbon dioxide bottles 98, syrup boxes and/or juice boxes 100, or any other appropriate fountain beverage consumables that may be necessary for the particular dispensing system 14. The fountain beverage consumables 94 may have accompanying hoses 36 that cooperate with a connection feature 24.

In various embodiments, the cart 12 has a docking station position 64 in which its connection features 24 can interface with connection ports 66. The docking station position 64 can be part of galley wall 60. However, it should be understood that the docking station position may be provided elsewhere in the aircraft. For example, if the dispensing unit 14 were to be positioned in a location other than the galley, the cart 12 may simply dock below wherever the dispensing unit 14 is located. In use, the user may simply press the soda consumable cart 12 against the galley wall 60 such that the connection features 24 cooperate with and appropriately fit with respect to connection ports 66. The user need not conduct any additional connection steps in order to create fluid connection between the fountain beverage consumables on the cart 12 and the dispensing unit 14. This may be referred to as a rapid connect feature. Likewise, when the cart 14 is to be removed, the user may simply apply a pulling pressure with respect to the cart 12 in order to disconnect the cart 12 from its docking station position 64.

One of the issues to be considered when designing the connection between the cart connect features 24 and the galley connection ports 66 is the relative movement of the cart with respect to the galley. For example, during turbulence, there may be up to about one inch of relative movement therebetween. One solution may be to provide one or more of the wheels 62 with a locking feature to prevent rolling of the cart 12.

An additional or alternate solution may be to install the connection hoses on plates. As shown in FIG. 14D, the hoses 36 extending from the cart 12 may be secured to a first plate 130. This plate 130 may be spring loaded with one or more springs 132 in order to account for and absorb a certain amount of movement. (Although the cart plate 130 is shown as spring-loaded in the Figures, it should be understood that the wall plate 134 may additionally or alternatively be spring-loaded.)

The hoses (not shown) extending from the dispensing unit 14 may be secured to a second plate 134. Plate 134 may be fixed to a securing position on the wall 60. In use, the two plates 130, 134 may connect to one another. For example, the connection may be similar to that shown and described above with respect to the universal connector system 34. As is common with aircraft regulations, there may be a secondary locking mechanism provided in order to ensure that the plates 130, 134 maintain a secure connection.

One example of a secondary locking mechanism 136 is illustrated by FIGS. 14A-14C. These figures illustrate a lever system with an upper capture 138 and a lower capture 140. In reverse order, FIG. 14C shows the plate 130 of the cart as the cart is being rolled into the docking station position 64. FIG. 14B shows the plate 130 of the cart in place with respect to the second plate 134, but not locked. FIG. 14C shows the plate 130 locked to plate 134 via a secondary locking mechanism 136. In the specific example shown, a lever system 142 at the docking station may have a front activation feature 144, such as a handle. Once the cart 12 is fully positioned, the front activation feature 144 may be activated to cause movement of the lever system 142. In a specific example, the lever system 142 may work via bell crank, but it should be understood that other systems are possible and considered within the scope of this disclosure. As shown, movement of the lever system 142 may cause the upper capture 138 and the lower capture 140 to depress plates 130 and 134 against one another for a secure secondary connection.

It is also possible for the docking station position 64 to include a cooling module that is capable of cooling the contents of the cart, when the cart is docked in the docking station position 64. Examples of such a cooling module are shown and described in co-owned U.S. Ser. No. 14/384,776. This may be particularly desirable in instances where the filtered water needs to reach a particularly cold temperature prior to its use in the fountain soda.

In various embodiments, when it is time for the cart to be re-filled, it may be removed from the aircraft and delivered to the catering kitchen. A new, filled soda consumable cart 12 may be wheeled on to the aircraft. This can greatly reduce aircraft turnaround time at the gate. At the catering kitchen, the used soda consumable cart may have empty syrup boxes and carbon dioxide bottles removed and refurbished with filled ones.

Although not generally optimal, it is also possible for new or replenished syrup boxes and carbon dioxide bottles to be replaced on board the aircraft. This may be done by simply opening the cart door 20, removing used consumables, and replacing them with fresh supplies.

Figure 8:
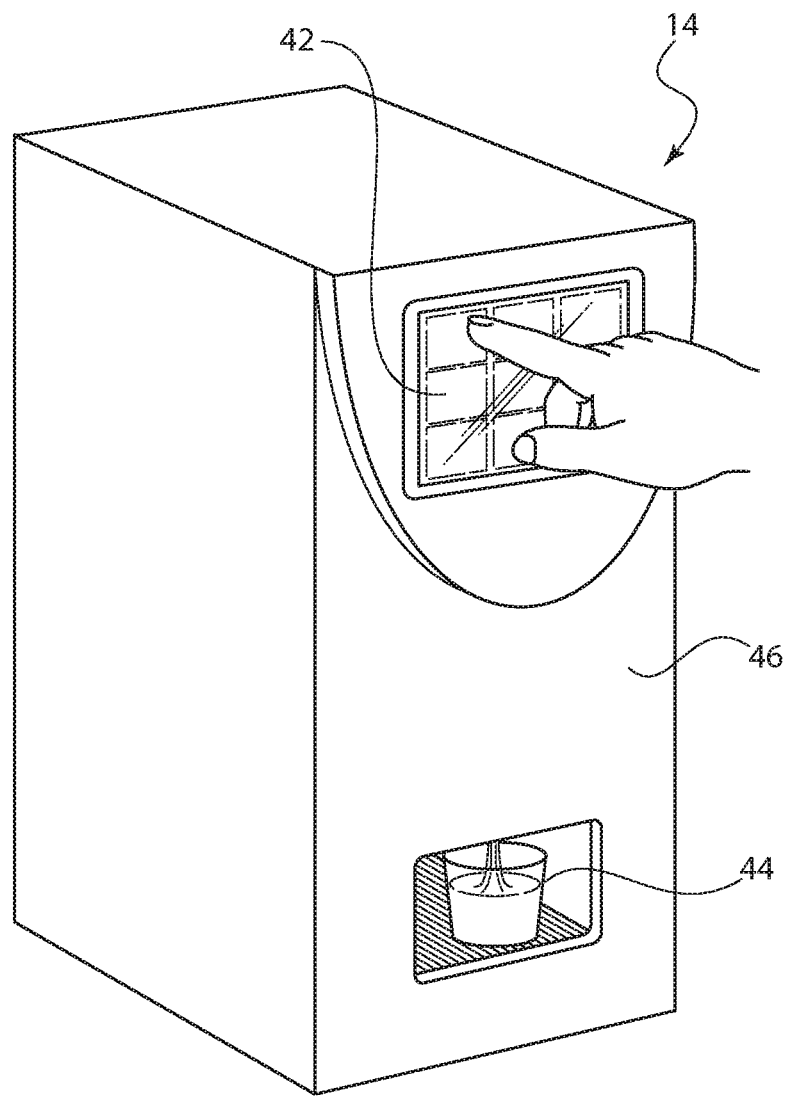
FIG. 8 shows a front perspective view of one embodiment of a dispensing unit.

FIG. 8 illustrates one embodiment of a dispensing unit 14. In one example, dispensing unit 14 may be a fixed dispensing system with a touch screen. As shown, the dispensing unit may have a user interface 42. User interface 42 may be a touch screen. It should also be understood that user interface 42 may include buttons, knobs, or any other appropriate input interface. Dispensing unit 14 is also shown as having a dispensing alcove 44. Dispensing alcove 44 is generally shaped as an interior space extending inwardly from a front panel 46. Dispensing alcove 44 is shaped to accept any appropriately sized cup or drink receptacle.

Figure 9:
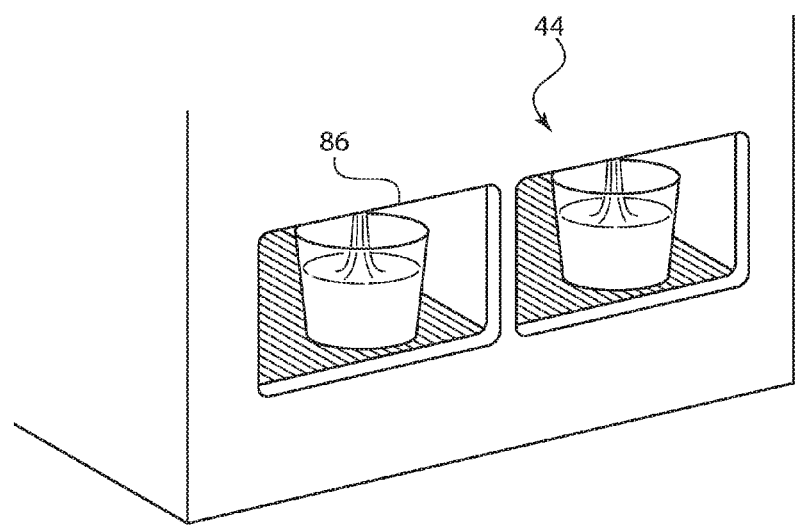
FIG. 9 shows a front perspective view of a double dispensing alcove.

As shown in FIG. 9, dispensing unit 14 may be provided with more than one dispensing alcove 44. FIG. 9 shows two dispensing alcoves 44, each having a single dispensing nozzle 86. However, it should be understood that additional alcoves 44 may be provided. In this instance, it may be possible to provide more than one user interface 42. In another embodiment, a single user interface 42 may be programmed to allow beverages to be delivered to more than one alcove 44.

Figure 10:
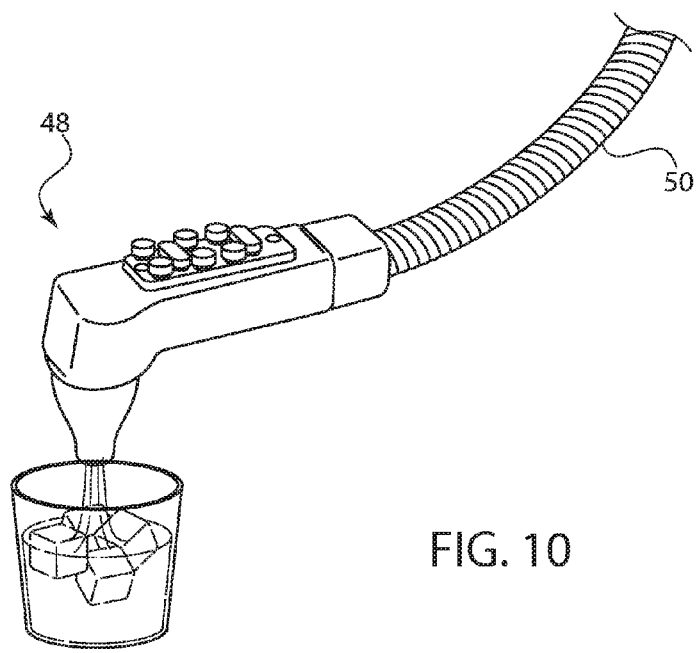
FIG. 10 shows one example of a dispensing wand that may be used in connection with a dispensing unit.

FIG. 10 illustrates an alternate dispensing feature. In one example, dispensing unit 14 may be a wand on a flexible hose. As shown, instead of, or in addition to, a dispensing alcove 44, dispensing unit 14 may have one or more dispensing wands 48. The dispensing wand 48 may have a single hose 50 in which a plurality of individual, thinner hoses are housed. In the example shown, dispensing wand 48 has selecting options that are capable of delivering ten or more different liquids from the wand 48. Accordingly, there may be ten or more thin hoses housed in the single hose 50. The thin hoses may individually connect to syrup connections 30 on the connect feature 24 of the cart 12.

Figure 11:
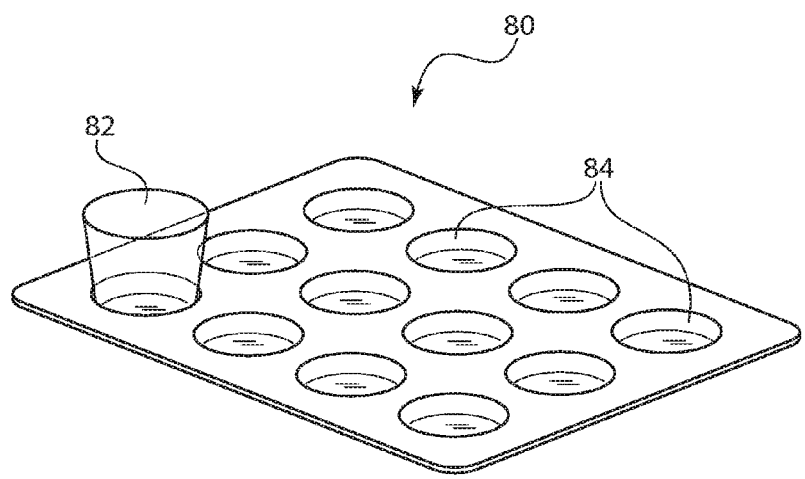
FIG. 11 shows a top plan view of a serving tray that may be used with an enlarged alcove of a dispensing unit.
Figure 12:
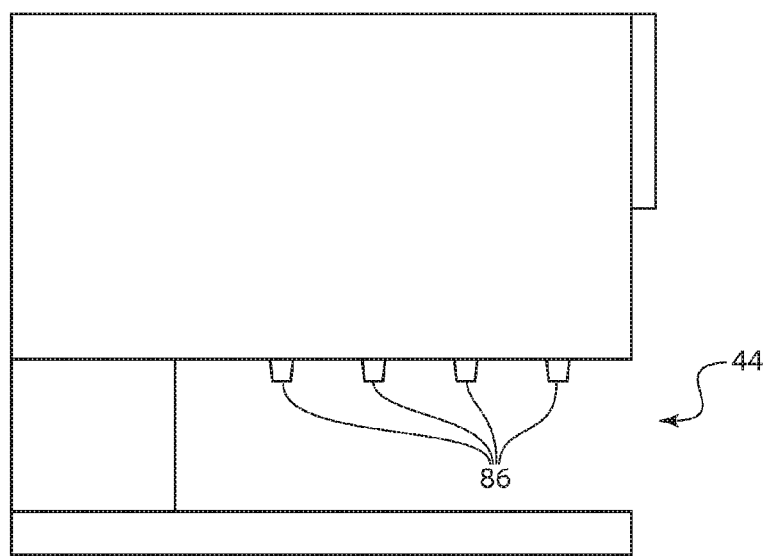
FIG. 12 shows a side perspective view of one embodiment of a dispensing unit having a plurality of dispensing nozzles and an enlarged alcove.

FIG. 11 shows one embodiment that may be used to fill a tray 80 with a plurality of cups 82. For example, as shown in FIG. 12, the dispensing alcove 44 may be sized to receive tray 80. Tray 80 may be provided with small indentations 84 that are intended to support cups 82. When the tray is loaded with cups 82 and positioned in the alcove 44 of the dispensing unit 14, it may be possible for the user interface 42 to be designed such that the plurality of cups may be filled with different beverages, selected via the user interface 42. For example, it would be possible for a first cup on the top row to be filled with cola, a second cup to be filled with orange juice, and a third cup to be filled with a lemon-lime soda. Any plurality of combinations are possible for the subsequent rows.

It is envisioned that this embodiment would be useful for airline attendants to take orders from multiple passengers. The attendant may then return to the galley in order to input the orders into the dispensing unit 14. However, rather than having to individually dispense the plurality of drink orders one at a time, it may be possible to input the plurality of orders and have them all dispense at once. The user interface 42 may be designed so that a user may choose a plurality of drinks and a plurality of positions in which they should be dispense at the same time. For this embodiment, there may plurality of drink dispensing nozzles 86 positioned in the alcove 44, as illustrated by FIG. 12.

In another embodiment, it is envisioned that the hybrid dispensing system 10 may be used in a "self-service galley." An airline may install a separate self-service galley or service area in an aircraft. This allows passengers to get up between meal and beverage services in order to obtain their own drinks and snack items. It is thus possible for a self-service galley to have one or more fixed dispensing units 14 (whether a touchscreen embodiment or a wand embodiment or other dispensing feature) with one or more soda consumable carts 12 positioned therebelow.

Accordingly, as described, the cart 12 may dock with a galley wall 60. This would cause the fountain beverage consumables positioned in the cart to be fluidly delivered to a dispensing unit 14 mounted in the galley G. This may be accomplished via one or more connect features 24 on the cart, and one or more connection ports 66 on the galley wall 60. The one or more connect features 24 and the one or more connection ports 66 cooperate when the cart is docked. For example, there may be a power connection, a water connection, one or more syrup connections, and a carbon dioxide connection. These connections may be provided individually or they may be provided as a universal connector/universal connection port. This allows the cart to be powered and to deliver its consumables to the dispensing unit 14.

In one embodiment, it is possible to serve soda fountain beverages using the following steps:
providing a soda fountain consumables cart; providing a fixed dispensing location with a docking station location; wherein the soda fountain consumables cart and the fixed dispensing location are fluidly connected in use via at least one connection feature on the cart and at least one connection port at the docking station location and operable with the fixed dispensing location; and docking the cart in the docking station location to cause the at least one connection feature to cooperate with the at least one connection port.

Figure 13:
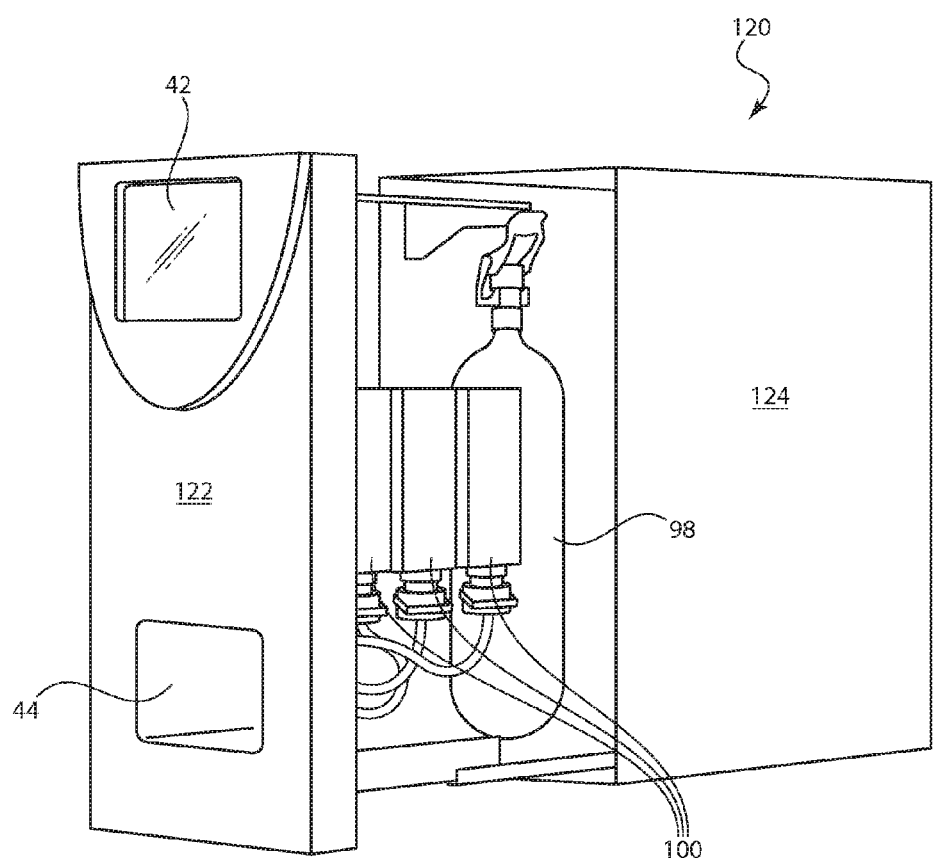
FIG. 13 shows an example of a dispensing unit having its fountain beverage consumables positioned integrally within the unit.

FIG. 13 illustrates one embodiment of an alternate dispensing unit 120. In this unit, a front panel 122 may be expanded from the unit main body 124. Unit main body 124 may house one or more syrup boxes 100 or one or more carbon dioxide bottles 98. The front panel 122 may have a user interface 42 and a dispensing alcove 44. One advantage of this embodiment is that it may be sized as and ARINC Size 2 device. Another advantage is that it may be self-contained. If syrup boxes or carbon dioxide bottles need to be removed, there may be a release latch (not shown) that allows a user to disengage the front panel 122 from the main body 124. The user may expand the front panel 122 away from main body 124 in order to reveal an interior of the main body space. The user may then remove used bottles or boxes and replaced them with replenished ones. The example illustrated provides three syrup boxes 100 shown, but in this embodiment, three additional syrup boxes would be on the other side (not shown).

One of the disadvantages of this alternate dispensing unit 120 is that it is limited in the number of syrup boxes and carbon dioxide bottles that it can accommodate. Another disadvantage is that the fountain beverage consumables are not easily removable and replaced as they are with the cart embodiment described above. However, it should be understood that alternate dispensing unit 120 may provide a real advantage for certain airlines seeking this design.

The soda industry has recently introduced the ability to add additional flavorings to traditional sodas. For example, a cherry flavored syrup box may deliver a cherry flavor to a traditional cola. This may be referred to as a freestyle dispensing. There is a first layer of core flavors provided, and then a second layer of flavored cartridges that may be provided. It should be understood that such flavored cartridges may also be incorporated into the fountain beverage consumable cart 12 system described here in.

Changes and modifications, additions and deletions may be made to the structures and methods recited above and shown in the drawings without departing from the scope or spirit of the disclosure or the following claims.

What is claimed is:

1. A hybrid dispensing system, comprising:
 a cart comprising an internal storage space for fountain beverage consumables and at least a first connection feature for securement to a fixed dispensing location;
 a fixed dispensing location comprising a corresponding connection port for fluid communication with fountain soda consumables contained in the cart,
 wherein the first connection feature and the corresponding connection port comprise a plurality of connection features and corresponding connection ports.

2. The system of claim 1, wherein the plurality of connection features is located on a rear face of the cart.

3. The system of claim 1, wherein plurality of connection ports is located on a rear galley wall.

4. The system of claim 1, wherein the plurality of connection features and the corresponding plurality of connection ports comprise universal connectors.

5. The system of claim 1, wherein the fixed dispensing location is installed in an aircraft galley.

6. The system of claim 1, wherein the fixed dispensing location comprises at least one dispensing alcove for receiving at least one cup.

7. The system of claim 1, wherein the fixed dispensing location comprises a dispensing wand.

8. The system of claim 1, wherein the fixed dispensing location comprises a user interface.

9. The system of claim 1, wherein the user interface comprises a touchscreen.

10. A hybrid dispensing system, comprising:
 a cart comprising an internal storage space for fountain beverage consumables and at least a first connection feature for securement to a fixed dispensing location;
 a fixed dispensing location comprising a corresponding connection port for fluid communication with fountain soda consumables contained in the cart,
 wherein the fountain beverage consumables comprise one or more syrup boxes and carbon dioxide bottles.

11. The system of claim 10, wherein the fixed dispensing location is installed in an aircraft galley.

12. The system of claim 10, wherein the fixed dispensing location comprises at least one dispensing alcove for receiving at least one cup, a dispensing wand, or a user interface.

13. The system of claim 10, wherein the cart comprises one or more shelves for supporting the fountain soda consumables.

14. The system of claim 13, wherein the one or more shelves are fixed.

15. The system of claim 13, wherein the one or more shelves are modular.

16. A hybrid dispensing system, comprising:
 a cart comprising an internal storage space for fountain beverage consumables and at least a first connection feature for securement to a fixed dispensing location;
 a fixed dispensing location comprising a corresponding connection port for fluid communication with fountain soda consumables contained in the cart, wherein the first connection feature comprises a first plate, wherein the corresponding connection port comprises a second plate, wherein at least one of the plates is spring-loaded.

17. The system of claim 16, further comprising a secondary locking mechanism to secure the first plate and the second plate to one another.

18. The system of claim 16, wherein the fixed dispensing location is installed in an aircraft galley.

19. The system of claim 16, wherein the fixed dispensing location comprises at least one dispensing alcove for receiving at least one cup, a dispensing wand, or a user interface.

* * * * *